(12) United States Patent
Choi

(10) Patent No.: US 8,687,137 B2
(45) Date of Patent: Apr. 1, 2014

(54) LIQUID CRYSTAL DISPLAY

(75) Inventor: Hyun Sic Choi, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 663 days.

(21) Appl. No.: 12/265,847

(22) Filed: Nov. 6, 2008

(65) Prior Publication Data
US 2009/0213291 A1 Aug. 27, 2009

(30) Foreign Application Priority Data
Feb. 25, 2008 (CN) .......................... 2008 1 0100885

(51) Int. Cl.
*G02F 1/1333* (2006.01)

(52) U.S. Cl.
USPC ............................................................ 349/58

(58) Field of Classification Search
USPC ................................................................ 349/58
See application file for complete search history.

(56) References Cited

U.S. PATENT DOCUMENTS

| | | | |
|---|---|---|---|
| 5,929,834 A * | 7/1999 | Inoue et al. | 345/104 |
| 2006/0132025 A1 * | 6/2006 | Gao et al. | 313/503 |
| 2007/0132906 A1 * | 6/2007 | Shen et al. | 349/58 |
| 2007/0222917 A1 * | 9/2007 | Ono | 349/65 |
| 2007/0278951 A1 * | 12/2007 | Koo et al. | 313/512 |
| 2008/0111949 A1 * | 5/2008 | Shibata et al. | 349/64 |
| 2008/0239195 A1 * | 10/2008 | Nishio et al. | 349/58 |

* cited by examiner

*Primary Examiner* — Eric Wong
(74) *Attorney, Agent, or Firm* — Ladas & Parry LLP

(57) ABSTRACT

The present invention relates to a liquid crystal display (LCD), comprising: a backlight unit; a plurality of optical films disposed above the backlight unit; and a liquid crystal panel disposed above the optical films, wherein a protection layer is disposed between the liquid crystal panel and the optical films in order to support the liquid crystal panel when the liquid crystal panel is bended.

7 Claims, 3 Drawing Sheets

LIQUID CRYSTAL DISPLAY

FIELD OF THE INVENTION

The present invention relates to a liquid crystal display (LCD).

BACKGROUND OF THE INVENTION

A liquid crystal display (LCD) is one type of the most popular flat panel displays available in the market. As shown in FIG. 1, for example, a conventional thin film transistor liquid crystal display (TFT-LCD) comprises a backlight unit (BLU) 10, an optical sheet 20, and a liquid crystal display panel 30 assembled with a color filter (CF) substrate and a TFT array substrate disposed sequentially on top of each other. The LCD display can further comprise a mold frame 50 disposed on at least one side of the display including the backlight unit 10, the optical sheet 20, and the panel 30 in order to fix and connect these parts. The LCD can also comprise an outer frame 40 disposed on the outside of the backlight unit 10, the optical sheet 20, the panel 30, and the mold frame 50. The backlight unit 10 can comprise a light guide plate 11, lamps 12 disposed on both sides of the light guide plate 11, a reflective plate 13 enclosing the lamps 12 and the light guide plate 11. The optical sheet 20 can comprise a plurality of optical films such as a diffusing film and a prism film in order to control the light towards the light guide plate. The panel is assembled with the color filter substrate 31 and the array substrate 32 with a liquid crystal layer disposed therebetween. The outer frame 40 is disposed at the periphery to provide support for the whole LCD. The mold frame 50 is fabricated by injection molding in order to fix and connect the parts such as the back light unit 10, the optical sheet 20 and the panel 30. A protrusion is formed on the mold frame 50 in order to maintain a spacing between the panel 30 and the optical sheet 20. The spacing can be about 1.0 mm.

The detailed structure of the panel 30 is shown in FIG. 2. In the panel 30, a black matrix (BM) 311 is disposed on inner side of the color filter substrate 31 for blocking the functional elements on the array substrate 32. Besides TFT switching devices, for example, the pixel electrodes array (ITO) 322, data lines 323 and the blocking bars (S/B) 324 between the data lines 323 and the pixel electrodes 322 are also disposed on the array substrate 32. In the operation of the LCD, the pixel electrodes on the color filter substrate may form a distorted electric field with the pixel electrodes on the array substrate and the data lines, thus forming a gap. In that case, the light from the light guide plate may leak through the gap between the blocking bars 324 and the data lines 323, as shown in FIG. 2. Most of the leaked lights can be blocked by the black matrix 311 disposed on the color filter substrate 31. However, when the panel is bended downwards under an external force as shown in FIG. 3, the black matrix 311 for blocking the lights would be shifted by a distance d2 from a desired position, thus forming a gap between the black matrix 311 and the pixel electrodes 322, as shown in FIG. 4, so that the light leaked through the gap between the blocking bars 324 and the data lines 323 can further leak through the gap between the black matrix 311 and the pixel electrodes 322. The further the panel is bended, the larger the black matrix would be shifted, thus deteriorating the leakage, which causes a touch mura phenomenon on the LCD.

In the conventional LCD as shown in FIG. 1, in order to prevent contact wearing, a gap is typically formed between the array substrate 32 and the optical sheet 20, for example, the gap with the height of d1 shown in FIG. 1. The height of d1 is typically about 1.0 mm due to the limitation of the injection molding. This gap allows the panel 30 to bend more and further deteriorate the light leakage and touch mura phenomenon.

Increasing the area of the black matrix on the color filter substrate can prevent the light leakage even if the black matrix was shifted by a distance due to the bending of the liquid crystal panel, however, in that case, the aperture ratio is decreased and the brightness of the LCD is compromised.

SUMMARY OF THE INVENTION

According to one embodiment of the present invention, there is provided a liquid crystal display (LCD). The LCD can comprise a backlight unit, an optical sheet disposed above the backlight unit; and a liquid crystal panel disposed above the optical sheet. A protection layer can be disposed between the liquid crystal panel and the optical sheet in order to support the liquid crystal panel when the liquid crystal panel is bended.

In one embodiment, the LCD can further comprise a mold frame disposed on one side of the LCD. A first protrusion located between the protection layer and the liquid crystal panel and a second protrusion located between the protection layer and the optical sheet are disposed on the mold frame for holding the protection layer therebetween.

In one embodiment, the protection layer can be formed of a material selected from the group consisting of glass, triacetated cellulose, polyethylene terephthalate and plastics.

In one embodiment, the protection layer can have a thickness in a range of 0.4-0.5 mm.

In one embodiment, the first protrusion can have a thickness in a range of 0.2-0.3 mm.

In one embodiment, the second protrusion can have a thickness in a range of 0.2-0.3 mm.

In one embodiment, the mold frame can comprise an upper mold frame and a lower mold frame attached together. The first protrusion can be disposed on the upper mold frame and the second protrusion can be disposed on the lower mold frame.

In the operation of the LCD according to the embodiments of the present invention, the protection layer disposed between the panel and the optical sheet can reduce the spacing allowing for the bending of the panel. Therefore, when the panel is bended under an external force, due to the support of the protection layer, the degree of bending of the panel can be reduced, and in turn the shift distance of the black matrix on the color filter substrate can be reduced, thus the light leakage, and the touch mura phenomenon can be alleviated and the display quality of the LCD can be improved.

In the embodiments of the present embodiment, protrusions are disposed on both sides of the protection layer, thus keeping a desired spacing between the protection layer and the adjacent parts, in particular, the optical sheet, so that the optical sheet can be protected and the friction between the panel and the optical sheet can be prevented in order to reduce the contact wearing and improve the durability of the product. Furthermore, in the present embodiment, the area of the black matrix is not increased and the aperture ratio of the LCD is not decreased, and thus the transmittance and the display brightness is not affected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE PREFERRED EMBODIMENTS

The present invention will be described in further details by the accompanying drawings and embodiments thereafter.

First Embodiment

Figure 1:
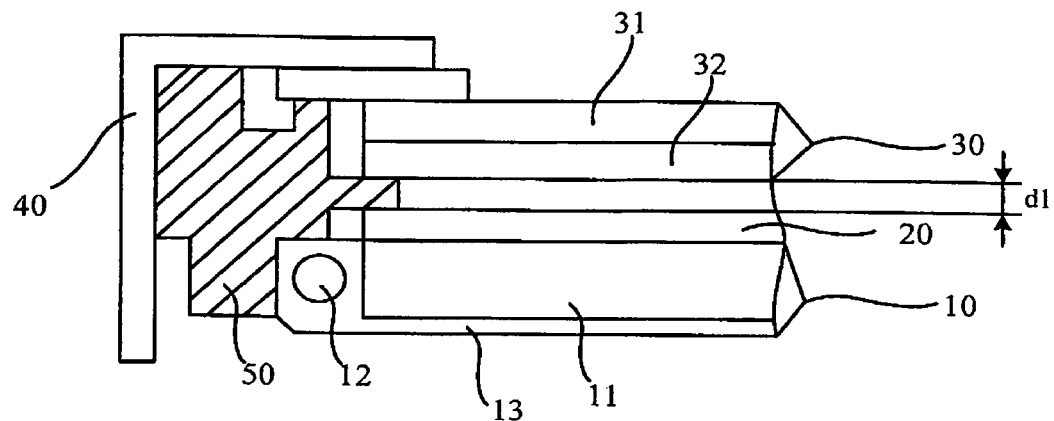
FIG. 1 is a schematic view showing a conventional LCD.
Figure 2:
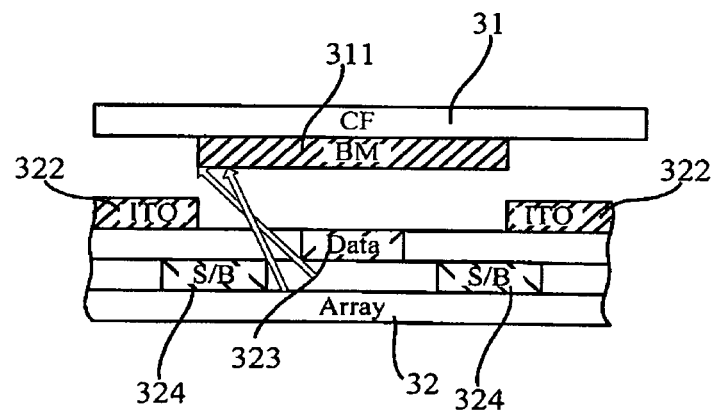
FIG. 2 is a schematic view showing a liquid crystal panel of a conventional LCD.
Figure 3:
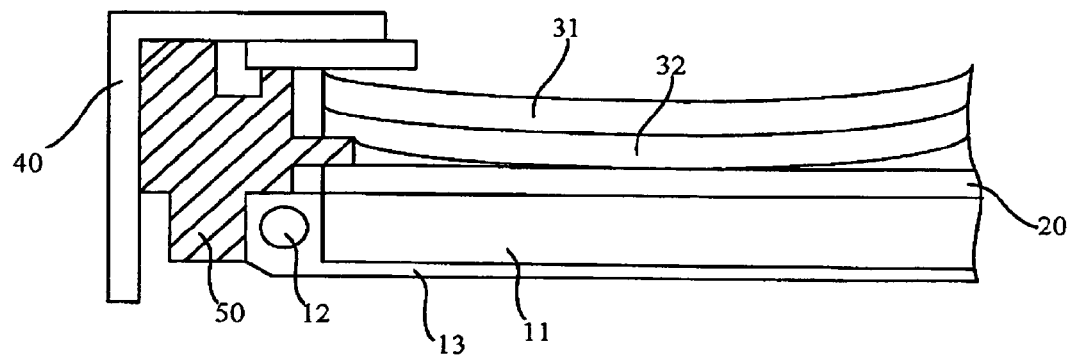
FIG. 3 is a schematic view showing a conventional LCD with a bended liquid crystal panel under an external force.
Figure 4:
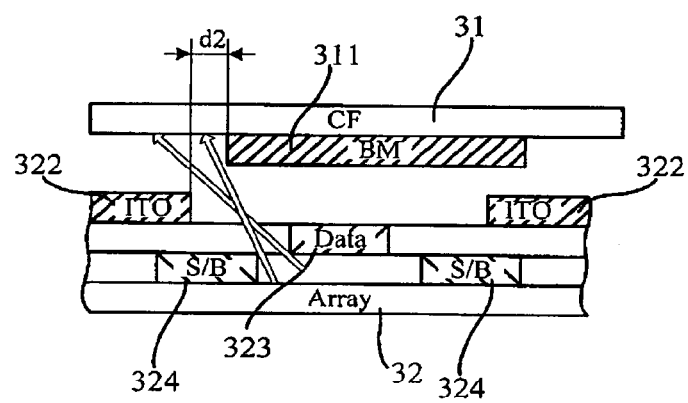
FIG. 4 is a schematic view showing a structure of a liquid crystal panel in a bending state in a conventional LCD.
Figure 5:
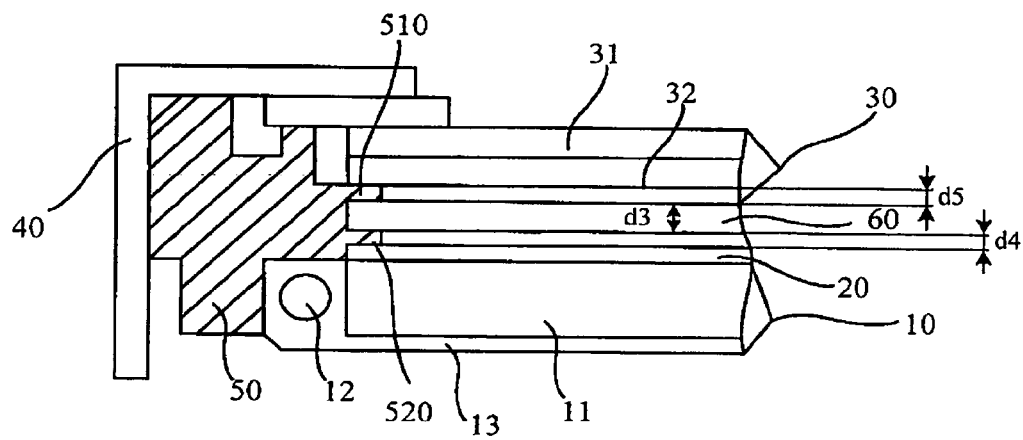
FIG. 5 is a schematic view showing a LCD according to a first embodiment of the present invention.

FIG. 5 is a schematic view showing the LCD according to the first embodiment of the present invention. As shown in FIG. 5, the LCD can comprise a backlight unit 10, an optical sheet 20 disposed above the backlight unit 10, and a liquid crystal panel 30 disposed above the optical sheet 20. A protection layer 60 is disposed between the liquid crystal panel 30 and the optical sheet 20 in order to support the liquid crystal panel 30 when the liquid crystal panel 30 is bended. The LCD can further comprise an outer frame 40 disposed on at least one side of the LCD and a mold frame 50 disposed between the outer frame 40 and the stacked assembly including the backlight unit 10, the optical sheet 20 and the panel 30. Thus the mold frame 50 is also disposed on the side of LCD.

In the LCD according to the present embodiment, the backlight unit 10 comprises a light guide plate 11, lamps 12 disposed on both sides of the light guide plate 11, and a reflective plate 13 enclosing the lamps 12 and the light guide plate 11. The optical sheet 20 can comprise a plurality of optical films such as diffusing film, prism film, etc. The panel 30 is assembled with the color filter substrate 31 and the array substrate 32 with a liquid crystal layer disposed between the color filter substrate 31 and the array substrate 32. Other components such as the black matrix, the pixel electrodes and the TFT switching devices are provided on the color filter substrate 31 and the array substrate 32, respectively.

In the present embodiment, a first protrusion 510 and a second protrusion 520 are disposed on the mold frame 50. The first protrusion 510 is disposed between the panel 30 and the protection layer 60, and the second protrusion 520 is disposed between the protection layer 60 and the optical sheet 20. The spacing between the first and second protrusions is located approximately in the middle of the portion of the mold frame 50 between the panel 30 and the optical sheet 20, thus forming a recess for holding the protection layer 60 therein.

In the present embodiment, the protection layer 60 can be formed of a material which have a small affect on the transmission of the light or have a lesser phase delay for the transmissive light, such as a transparent material selected from the group consisting of glass, triacetated cellulose (TAC), polyethylene terephthalate (PET), and plastics. The protection layer 60 can be in a form of continuous flat layer, or in a form of lattice, as long as it can support the panel 30 when the panel 30 is bended. In one example, the thickness of the protection layer 60 can be about 0.4-0.5 mm. The gap between the protection layer 60 and the optical sheet 20, that is, the thickness of the second protrusion can be about 0.2-0.3 mm. The gap between the protection layer 60 and the panel 30, that is, the thickness of the first protrusion can be 0.2-0.3 mm.

Figure 6:
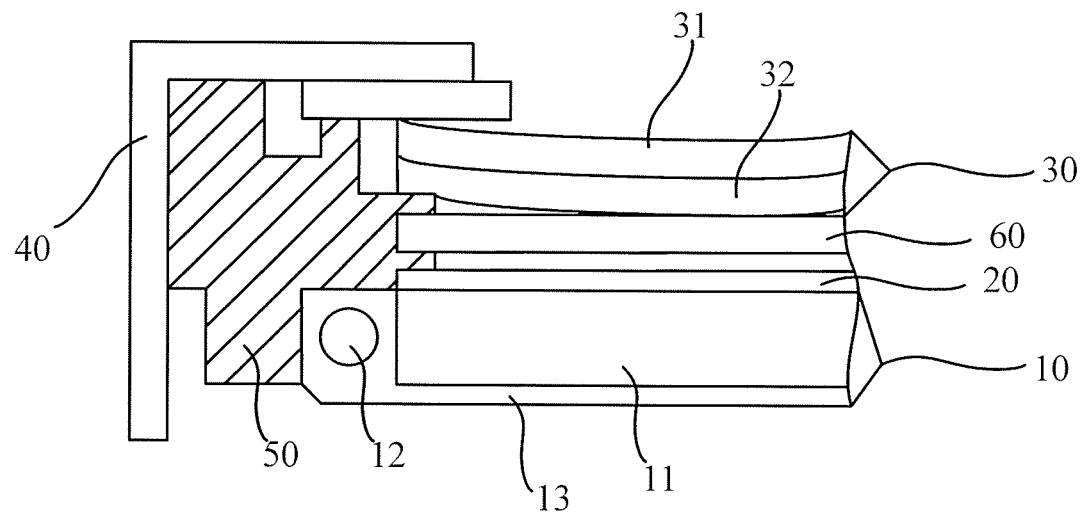
FIG. 6 is a schematic view showing a LCD with a bended liquid display panel according to the first embodiment of the present invention.

In the operation of the LCD according to the present embodiment, the panel 30 might be bended under an external force, as shown in FIG. 6. The protection layer 60 disposed between the panel 30 and the optical sheet 40 can reduce the space allowing for the bending of the panel 30. Therefore, when the panel is bended under an external force, due to the support of the protection layer 60, the degree of bending of the panel 30 can be reduced, and in turn the shift distance of the black matrix on the color filter substrate can be reduced, thus the light leakage and accordingly the touch mura phenomenon can be alleviated and the display quality of the LCD can be improved.

In the present embodiment, protrusions are disposed on both sides of the protection layer, thus keeping a desired spacing between the protection layer and the adjacent components, in particular, the optical sheet, so that the optical sheet can be protected and the friction between the panel and the optical sheet can be prevented in order to reduce the contact wearing and improve the durability of the product. Furthermore, in the present embodiment, the area of the black matrix is not increased and the aperture ratio of the LCD is not decreased, and thus the transmittance and the display brightness are not affected.

Second Embodiment

Figure 7:
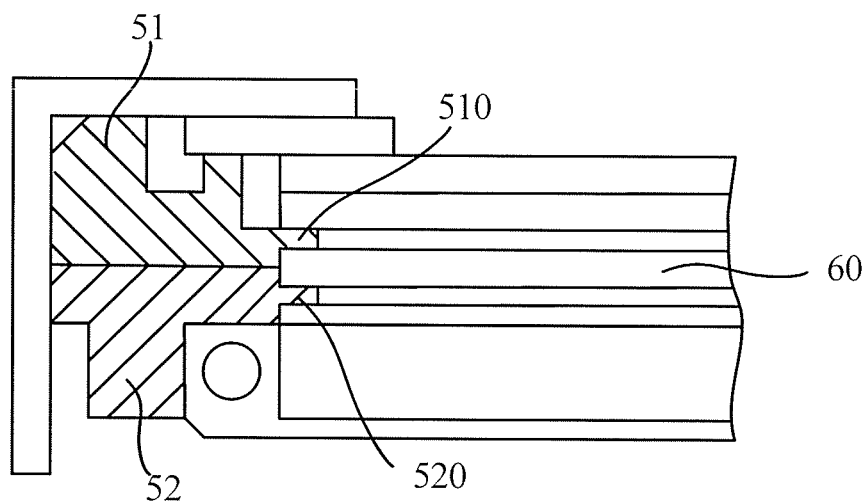
FIG. 7 is a schematic view showing a LCD according to a second embodiment of the present invention.

FIG. 7 is a schematic view showing a LCD according to the second embodiment of the present invention. The LCD according to the second embodiment can be substantially the same as the LCD according to the first embodiment, except the structure of the mold frame. In the first embodiment, the mold frame is formed as an integrated body and the first and second protrusion are formed on the mold frame. The protection layer is held between the two protrusions. While in the present embodiment, the mold frame can be formed into two molding parts attached together, that is, an upper mold frame 51 and a lower mold frame 52. The first protrusion 510 is disposed on the upper mold frame 51, and the second protrusion 520 is disposed on the lower mold frame 52. The first protrusion 510 and the second protrusion 520 work together to hold the protection layer 60.

In the injection molding process, it is difficult to form two protrusions with a small spacing in the same molding frame since there is a size limitation for the two adjacent protrusions with a close gap. The smallest spacing between two adjacent protrusions is typically about 1.0-1.1 mm in a conventional process, and in that case, the smallest thickness of each protrusion formed by the injection molding process can reach about 0.2-0.3 mm. In the present embodiment, the first protrusion 510 and the second protrusion 520 can be fabricated by separate injection molding processes; therefore, the difficulty of the injection molding process can be reduced so that it is possible to form protrusions with smaller spacing.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A liquid crystal display (LCD), comprising:
a backlight unit;
an optical sheet disposed above the backlight unit; and
a liquid crystal panel disposed above the optical sheet,
wherein a protection layer is disposed between the liquid crystal panel and the optical sheet in order to contact and thus support the liquid crystal panel when the liquid crystal panel is bended;
the liquid crystal display further comprises a mold frame disposed on one side of the LCD, a first protrusion located between the protection layer and the liquid crystal panel and a second protrusion located between the protection layer and the optical sheet being disposed on the mold frame for holding the protection layer therebetween, and the first and the second protrusions projecting from a side portion of the mold frame towards a display area of the liquid crystal panel; and
a gap between the protection layer and the liquid crystal panel is in a range of 0.2-0.3 mm.

2. The LCD according to claim 1, wherein the protection layer is formed of one material selected from the group consisting of glass, triacetated cellulose, polyethylene terephthalate and plastic.

3. The LCD according to claim 1, wherein the protection layer has a thickness in a range of 0.4-0.5 mm.

4. The LCD according to claim 1, wherein the second protrusion has a thickness in a range of 0.2-0.3 mm.

5. The LCD according to claim 1, wherein the mold frame comprises an upper mold frame and a lower mold frame attached together, and wherein the first protrusion is disposed on the upper mold frame and the second protrusion is disposed on the lower mold frame.

6. The LCD according to claim 2, wherein the mold frame comprises an upper mold frame and a lower mold frame attached together, wherein the first protrusion is disposed on the upper mold frame and the second protrusion is disposed on the lower mold frame.

7. The LCD according to claim 3, wherein the mold frame comprises an upper mold frame and a lower mold frame attached together, wherein the first protrusion is disposed on the upper mold frame and the second protrusion is disposed on the lower mold frame.

* * * * *